United States Patent [19]

Hayashi et al.

[11] Patent Number: 4,525,576

[45] Date of Patent: Jun. 25, 1985

[54] PROCESS FOR PRODUCING SEQUENTIAL POLYAMINO ACID RESIN

[75] Inventors: Ikuo Hayashi, Koriyama; Tadao Itikawa, Fukushima; Keizo Ogihara, Sukagawa; Kiyoshi Shimizu, Koriyama, all of Japan

[73] Assignee: Nitto Boseki Co. Ltd., Fukushima, Japan

[21] Appl. No.: 660,946

[22] Filed: Oct. 15, 1984

[30] Foreign Application Priority Data

Oct. 17, 1983 [JP] Japan .................................. 58-193945

[51] Int. Cl.$^3$ ....................... C08G 69/08; C08G 73/10; C08G 69/10
[52] U.S. Cl. .................................. 528/313; 528/315; 528/322; 528/328
[58] Field of Search ................ 528/313, 315, 322, 328

[56] References Cited

U.S. PATENT DOCUMENTS

| | | | |
|---|---|---|---|
| 2,671,772 | 3/1954 | MacDonald et al. | 528/328 |
| 2,871,225 | 1/1959 | Bortnick | 528/328 |
| 3,474,083 | 10/1969 | Shiga et al. | 528/328 |
| 4,125,519 | 11/1978 | Goodman et al. | 528/328 |

*Primary Examiner*—Edward J. Smith
*Attorney, Agent, or Firm*—Bert J. Lewen

[57] ABSTRACT

A sequential polyamino acid resin having a remarkably high molecular weight and special amino acid sequence as repeating unit in the resin can be produced by conducting polycondensation of a dipeptide active ester acid salt in an aprotic polar solvent in the presence of a tertiary amine and phosphorus pentoxide.

8 Claims, No Drawings

PROCESS FOR PRODUCING SEQUENTIAL POLYAMINO ACID RESIN

BACKGROUND OF THE INVENTION

This invention relates to a process for producing a sequential polyamino acid resin having a high degree of polymerization and a constant amino acid sequence as repeating unit in the resin.

As a synthetic method of ordinary polyamino acids, there is well known a method which comprises polymerizing an amino acid-N-carboxy anhydride (NCA). However, strictly speaking, no sequential polyamino acid having a constant amino acid sequence can be obtained even when different two amino acid-N-carboxy anhydrides, amino acid-NCA-1 and amino acid-NCA-2 are copolymerized by the above-mentioned method. This is because in general, NCA-1 and NCA-2 are different in reactivity and hence the ratio of the amino acid-1 to the amino acid-2 in the resulting polymer changes depending on proportions of amino acid-NCAs, which results in producing a random (non-sequential) copolymer.

In order to remove the defects described above, there have been proposed many methods which comprise effecting polymerization by using, as a monomer, an activated peptide having desired amino acid sequence. For example, it has been reported that poly(L-prolyl-L-leucyl-glycine) is obtained by a method which comprises polymerizing L-prolyl-L-leucyl-glycine.hydrochloride in the presence of dicyclohexylcarbodiimide and a base (hereinafter referred to as "DCC method" or a method which comprises polymerizing a chlorinated phenyl ester of L-prolyl-L-leucyl-glycine.trifluoroacetate in the presence of an organic amine (hereinafter referred to as "active ester method") [H. Kitaoka, S. Sakakibara, H. Tani: Bull. Chem. Soc., Japan, 31, 802(1958) and Japanese Patent Appln Kokai (Laid-Open) No. 137495/77]. Further, there has also been reported a comparison made by applying all the methods comprising mutually combining amino acids (coupling methods of amino acids) to peptides as monomer, investigating the polymerization reaction of the peptides, and comparing merits and demerits of the methods as polymerization methods (B. J. Johnson: J. Pharm. Sci., 63, 313 (1974), and "Chemistry and Biochemistry of Amino Acids, Peptides and Proteins" edited by B. Weinstein, vol. 4, p. 29 Marcel Deckker Inc., New York).

However, according to any of the methods described above, the resulting polymer has an average molecular weight of several thousands or less, and its inherent viscosity ηinh (C=0.5) is only 0.1 to 0.2 as measured in dichloroacetic acid at a concentration of 0.5 g/dl.

On the other hand, it is generally known that when polymerization is carried out by using a dipeptide as a monomer, dimers or trimers formed in the course of the polymerization easily cause cyclization reaction to give cyclic peptides. Therefore, it is generally said that a high molecular weight is difficult to attain by polymerizing a dipeptide. In fact, no polymer can substantially be obtained by carrying out polymerization by the above-mentioned method.

Owing to these circumstances, it is generally accepted in the industrial world and the academic world that no polyamino acid having a high molecular weight can be obtained by polymerizing a peptide, in particular, dipeptide as a monomer (see the same literature as described above).

SUMMARY OF THE INVENTION

An object of this invention is to provide a process for producing a sequential polyamino acid resin having a high molecular weight which has heretofore been unable to be obtained by using a dipeptide as a monomer.

This invention provides a process for producing a sequential polyamino acid resin having a high molecular weight and special amino acid sequence as repeating unit in the resin, which comprises conducting a polycondensation reaction of a dipeptide active ester acid salt represented by the formula:

$$H—X_1—X_2—Y.Z \qquad (I)$$

wherein $X_1$ and $X_2$ are independently L-, D- or DL-α-amino acid residues protected or non-protected at a side chain in the formula: $H—X_1—OH$ or $H—X_2—OH$ (in which H is a hydrogen atom in an amino group and may be replaced by a protective group for an amino acid; and OH is the hydroxyl moiety in a carboxyl group); H is a hydrogen atom in an amino group; Y is a functional group represented by the formula:

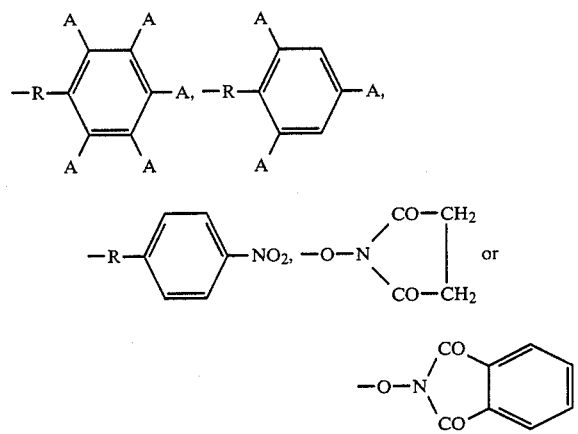

(in which A is a chlorine or bromine atom; and R is a sulfur or oxygen atom); and Z is HBr, HCl, HF, $CF_3COOH$ or p-toluenesulfonic acid, in an aprotic polar solvent in the presence of a tertiary amine and phosphorus pentoxide.

DESCRIPTION OF THE PREFERRED EMBODIMENTS

In this invention, the dipeptide active ester acid salt of the formula (I) is used as a monomer. Examples of α-amino acids of the formula: $H—X_1—OH$ or $H—X_2—OH$ are alanine (Ala), glycine (Gly), serine (Ser), valine (Val), threonine (Thr), cysteine (CySH), leucine (Leu), isoleucine (Ileu), methionine (Met), phenylalanine (Phe), tyrosine (Tyr), aspartic acid (Asp), glutamic acid (Glu), asparagine ($AspNH_2$), glutamine ($GluNH_2$), lysine (Lys), arginine (Arg), cystine (CyS), proline (Pro), hydroxyproline (Hyp), histidine (His), etc.

Examples of the dipeptide active ester acid salt of the formula (I) are as follows:
leucyl-glycine pentachlorophenyl ester.hydrochloride,
N-ε-benzyloxycarbonyl-lysyl-glutamic acid-γ-benzyl-α-p-nitrophenyl ester.p-toluenesulfonate.

The dipeptide active ester acid salts of the formula (I) used as a monomer in this invention preferably have a high purity. They can be prepared by a conventional peptide synthesis method. For example, a methyl or ethyl ester of an amino acid is coupled with an amino group-protected amino acid, and the alkyl ester moiety of the resulting product is selectively cut, followed by coupling with an active alcohol such as a chlorinated phenol to produce an amino group-protected dipeptide active ester. After removing the protective group for amino group, there is obtained the dipeptide active ester acid salt of the formula (I) used as the monomer.

As the protective group for amino acid, there can be used conventional ones such as a benzyloxycarbonyl group, a p-methoxybenzyloxycarbonyl group, a t-butyloxycarbonyl group, a t-amyloxycarbonyl group, an o-nitrophenylsulfenyl group, a t-butoxycarbonyl-N-ε-benzyloxycarbonyl group, etc.

As the active alcohol, there can be used chlorinated phenols such as pentachlorophenol, 2,4,6- or 2,4,5-trichlorophenol, p-chlorophenol, etc., nitrophenols such as p-nitrophenol, o-nitrophenol, etc., N-hydroxyimides such as N-hydroxysuccinimide, etc.

For preparing the dipeptide active ester acid salts of the formula (I), the above-mentioned conventional DCC method, active ester method, and NCA method can be used alone or in combination. But since the yield and purity of the product in the peptide synthesis are remarkably influenced by the order of combination and reagents used, and the polymerization reaction is also influenced, much care is necessary for employing these methods.

The dipeptide active ester acid salt of the formula (I) is dissolved in an aprotic polar solvent.

As the aprotic polar solvent, there can be used dimethylformamide (DMF), diethylformamide, dimethylacetamide, dimethyl sulfoxide (DMSO), tetramethylurea, hexamethylphosphoramide, N-methyl-2-pyrrolidone, diethyl phosphite, etc. These solvents can be used alone or as a mixture thereof.

The polycondensation of the dipeptide active ester acid salt of the formula (I) dissolved in the aprotic polar solvent is carried out in the presence of a tertiary amine.

As the tertiary amine, there can be used triethylamine, triethanolamine, trimethylamine, N-methyl morpholine, N,N'-dimethyl piperadine, etc. Among them, triethylamine and N-methyl morpholine are preferable.

The tertiary amine is used preferably in an amount of 1 to 5 equivalent weight per equivalent weight of the monomer of the formula (I). If the amount is too small, the effect for increasing the degree of polymerization is insufficient, while if the amount is too large, racemization takes place due to a free base.

Phosphorus pentoxide is added to the reaction mixture preferably after 10 minutes to 48 hours from the beginning of the polymerization (polycondensation) (that is, the addition of a tertiary amine to the aprotic polar solvent dissolving the monomer of the formula (I)) in an amount of preferably 0.01 to 10 equivalent weight per equivalent weight of the monomer of the formula (I). If the amount is too small, the catalytic effect is insufficient, while if the amount is too large, the whole polymerization system is solidified to lose practical meaning. More preferable amount of phosphorus pentoxide is 1 to 3 equivalent weight per equivalent weight of the monomer of the formula (I).

Phosphorus pentoxide can be added to the reaction mixture at one time or at several times without influencing the degree of polymerization or without lowering optical purity of the polyamino acid.

The polycondensation is preferably carried out at room temperature (20° C.) to 100° C. for 4 hours to about 2 weeks, more preferably 3 to 10 days. The reaction is mainly carried out in the gel state.

After the reaction, the resulting sequential polyamino acid resin can be recovered by a conventional method. For example, chloroform is added to the reaction solution and the polyamino acid resin is deposited by adding ethyl ether thereto. After washing with water and then acetone or methanol, the polyamino acid resin is dissolved in dichloroacetic acid, hexafluoroisopropanol, dimethylformamide, or trifluoroethanol, reprecipitated with ethyl ether, washed with water and then acetone or methanol and dried to give purified polyamino acid resin. In some cases, the product after the polycondensation may simply treated with a sodium bicarbonate solution, and the residue is filtered, washed with water, a 50% aqueous acetone and ether, in this order, and dried.

The resulting polyamino acid resin usually has a remarkably high molecular weight [an inherent viscosity ($\eta$inh) of 0.3 to 2 or more, e.g. 3 dl/g (measured in DCA (dichloroacetic acid) at a concentration (C) of 0.075 g/dl at 30° C.)] and can be dissolved in dichloroacetic acid, 1,1,1,3,3,3-hexafluoro-2-propanol, 1,1,1-trifluoroethanol, etc. Amino acid analytical values of acid hydrolysis product of the resulting polyamino acid resin well agree to the composition of amino acids used as monomer and the elementary analysis values are also in good agreement with the theoretical values. Further, infrared spectra of the polyamino acid resin show characteristic absorptions of polypeptide.

The thus produced polyamino acid resin can be used as high polymers for medical use, artificial skin, various medicines having gradual and prolonged pharamcological efficiency, a coating material for burn and a base for mecidines and cosmetics. More in detail, according to this invention, since a peptide having a special combination of minimum units necessary for physiological activity or structure similar to a living body can be polymerized and a peptide having a very high molecular weight can be obtained in contrast to conventional methods wherein random copolymers are obtained, the resulting sequential polyamino acid resin can be used as protein models in diverse areas. Further, even if a sequential polyamino acid can be obtained by a known method, the molecular weight of the resulting polyamino acid is considerably low compared with that obtained according to this invention. In addition, since a high molecular weight sequential polyamino acid resin is produced according to this invention, it is possible to obtain excellent film-forming properties for artificial skin and higher mechanical strength compared with conventional low molecular weight polyamino acid by properly selecting the combination of unit amino acids.

This invention is illustrated by way of the following Examples.

EXAMPLE 1

(1) Production of leucyl-glycine-pentachlorophenyl ester.hydrochloride

In 300 ml of tetrahydrofuran were dissolved 40.0 g of N-t-butoxycarbonyl-leucyl-glycine and 38.8 g of pentachlorophenol, after which 30.0 g of dicyclohexylcarbodiimide (DCC) was added with ice-cooling, and the resulting mixture was subjected to reaction overnight. The insoluble material was collected by filtration and the solvent was removed by distillation to obtain a solid, which was recrystallized from ethyl acetate and petroleum ether to obtain N-t-butoxycarbonyl-leucyl-glycine-pentachlorophenyl ester. Yield: 65.9 g (88.5%). $[\alpha]_D^{24} = -23.4°$ (C=1, dimethylformamide). Melting point (Mp): 155°–157° C.

To 31.7 g of the aforesaid ester was added 295 ml of 2.11N HCl-acetic acid, and the resulting mixture was subjected to reaction for 1.5 hours while protecting the reaction from moisture, whereby leucyl-glycine-pentachlorophenyl ester.hydrochloride was obtained. For purification, the hydrochloride was recrystallized from methanol and ether to obtain 22.6 g (80.7%) of the hydrochloride in a pure form. Mp: 164°–166° C. $[\alpha]_D^{26} = +2.85°$ (C=1, methanol). Rf value in thin layer chromatography; chloroform-methanol-acetic acid (95:5:3) was used as a developing solvent. Rf=0.82 (for color development, ninhydrin reagent was used).

(2) Production of poly(leucyl-glycine)

In 1.5 ml of DMSO was dissolved 1.0 g of the leucyl-glycine-pentachlorophenyl ester.hydrochloride obtained in above (1), and 0.427 g of N-methylmorpholine was added. The resulting mixture was immediately placed in a thermostat at 40° C. After 2 hours, 5 hours or 12 hours, 0.30 g, 0.60 g or 0.60 g, respectively, of phosphorus pentoxide was added to the polymerization system (Run Nos. 1 to 3). When the reaction was carried out at 40° C. for 6 days in total from the addition of the tertiary amine, the whole reaction mixture solidified to become gelatinous.

After the reaction, the phosphorus pentoxide was decomposed by adding 1N NaHCO₃ in an amount of 6 ml or 19 ml to 0.30 g or 0.60 g, respectively, of the phosphorus pentoxide. The residue was collected by filtration, washed with water, thoroughly washed with 50% aqueous acetone and then ether, and sufficiently dried over phosphorus pentoxide to obtain the desired product.

The reaction conditions, yields, physical properties of the products are as shown in Table 1.

TABLE 1

| Run No. | Addition of phosphorus pentoxide | | Yield (%) | Viscosity $\eta$inh (g/dl) (C = 0.075, DCA) | $[\alpha]_D^{27}$ (C = 0.075, DCA) |
|---|---|---|---|---|---|
| | Amount (g) | Time (hr) | | | |
| 1 | 0.30 | 2 | 47.0 | 0.49 | −82.7° |
| 2 | 0.60 | 5 | 86.2 | 0.44 | −86.7° |
| 3 | 0.60 | 12 | 83.3 | 0.47 | −73.0° |

Note
DCA = dichloroacetic acid

For comparison, in the case where no phosphorus pentoxide was added, there could be obtained only as very low values as yield: 5% and $\eta$inh=0.12 (C=0.075, dichloroacetic acid).

EXAMPLE 2

(1) Production of N-ε-benzyloxycarbonyl-lysyl-glutamic acid-γ-benzyl-α-p-nitrophenyl ester.p-toluenesulfonate In 600 ml of tetrahydrofuran was dissolved 53.03 g of N-α-o-nitrophenylsulfenyl-N-ε-benzyloxycarbonyl-lysine, after which 48.29 g of glutamic acid-γ-benzyl-α-p-nitrophenyl ester hydrochloride was dissolved in the resulting solution, and the solution thus obtained was cooled to 0° C. A solution of 25.23 g of dicyclohexylcarbodiimide (DCC) in 200 ml of tetrahydrofuran was added, and the resulting mixture was vigorously stirred with cooling. After about 45 minutes, into this system was slowly dropped a solution of 12.37 g of N-methylmorpholine in 120 ml of tetrahydrofuran over a period of about 1 hour. The reaction was continued at 0° C. for another 3 hours, after which the stirring was continued overnight at room temperature. The insoluble material was removed by filtration, and the filtrate was concentrated to a volume of about 300 ml, after which 900 ml of isopropanol was added, and the resulting mixture was cooled to obtain crystals. The crystals were collected by filtration and washed with ether to obtain a yellow solid. The yellow solid was recrystallized from acetone-isopropanol to obtain 47.5 g (50.2%) of N-α-o-nitrophenylsulfenyl-N-ε-benzyloxycarbonyl-lysyl-glutamic acid-γ-benzyl-α-p-nitrophenyl ester, mp 135°–137° C.

After 47.5 g of this compound was reacted with 45 ml of 3.4N-hydrochloric acid/ethyl acetate in 145 ml of dioxane for 30 minutes, ether was added to the reaction mixture to deposit N-ε-benzyloxycarbonyl-lysyl-glutamic acid-γ-benzyl-α-p-nitrophenyl ester.hydrochloride. Yield: 40.2 g (99.7%).

Since the hydrochloride thus obtained was gelatinous, it was reacted with sodium p-toluenesulfonate in order to recrystallize it. That is to say, 40.2 g of the aforesaid hydrochloride was dissolved in 800 ml of methanol, followed by dissolving therein 17.88 g of sodium p-toluenesulfonate. The resulting transparent solution was stirred for 3 hours, after which the whole solvent was removed by distillation to obtain a white solid. This solid was recrystallized from water to obtain 37.8 g (78.0%) of the desired compound, mp 174°–178° C., $[\alpha]_D^{25} = -4.6°$ (C=1, methanol).

(2) Production of poly(N-ε-benzyloxycarbonyl-lysyl-glutamic acid-α-benzyl ester)

Under the reaction conditions shown in the following Table 2, 1.2 g of the monomer obtained in above (1) was polymerized for 6 days in the presence of a tertiary amine and phosphorus pentoxide (P₂O₅). After the reaction, the gelatinous substance thus obtained was diluted with 25 ml of DMF and poured into 200 ml of a 50% aqueous methanol solution to obtain a solid. The solid was collected by filtration, washed with methanol, water, methanol, and then ether, and dried in vacuo to obtain a polymer, physical properties of which are as shown in Table 2.

TABLE 2

| Run No. | Reaction conditions | Yield (%) | $\eta$inh | $[\alpha]_D^{28}$ |
|---|---|---|---|---|
| 1 | The monomer was dissolved in 1.5 ml of DMF, after which 0.17 g of triethylamine was added, and the resulting mixture was subjected to reaction at 40° C. | 23.4 | 0.12 | −40.0° |
| 2 | The monomer was dissolved in 1.5 ml of DMSO, after which 0.25 g of N—methylmorpholine was added | 22.5 | 0.18 | −42.8° |

TABLE 2-continued

| Run No. | Reaction conditions | Yield (%) | ηinh | $[\alpha]_D^{28}$ |
|---|---|---|---|---|
|  | and the resulting mixture was subjected to reaction. | | | |
| 3 | The monomer was dissolved in 1.5 ml of DMSO after which 0.25 g N—methylmorpholine was added, and the resulting mixture was subjected to reaction at 40° C. After 5 hours, 0.47 g of phosphorus pentoxide was added. | 86.3 | 0.77 | −54.7° |
| 4 | The same procedure as in No. 3 was followed, except that 0.23 g of phosphorus pentoxide was added after 5 hours. | 90.5 | 0.54 | −65.3° |
| 5 | The same procedure as in No. 3 was followed, except that 0.23 g of phosphorus pentoxide was added after 8 hours. | 78.9 | 0.60 | −68.0° |
| 6 | The same procedure as in No. 3 was followed except that 0.47 g of phosphorus pentoxide was added after 18 hours. | 86.6 | 0.49 | −52.0° |
| 7 | The same procedure as in No. 3 was followed, except that 0.23 g of phosphorus pentoxide was added after 24 hours. | 92.3 | 0.42 | −62.3° |

In Table 2, ηinh is inherent viscosity measured in DCA at a concentration of 0.05 g/dl, and the values of $[\alpha]_D^{28}$ were measured at the same concentration as with ηinh.

Run Nos. 1 and 2 in Table 2 are systems containing no phosphorus pentoxide and are shown for comparison.

As is evident from Table 2, the effect of addition of phosphorus pentoxide of this invention is markedly observed.

EXAMPLE 3

In 7.5 ml of DMSO was dissolved 6.0 g of the monomer obtained in Example 2(1), after which 1.25 g of N-methylmorpholine was added, and the resulting mixture was subjected to reaction in a shaking thermostat at 40° C. An experiment was carried out by changing a method for adding a total amount of 2.35 g of phosphorus pentoxide after initiation of the reaction as shown in Table 3. After the reaction, the gelatinous substance formed was diluted with 125 ml of DMF and poured into a 1,000 ml of a 50% aqueous methanol solution. The precipitate formed was collected by filtration, and washed successively with methanol, water, methanol and ether to obtain a polymer. The results are shown in Table 3.

TABLE 3

| Run No. | Addition conditions of $P_2O_5$ | Yield % | ηinh | $[\alpha]_D^{28}$ |
|---|---|---|---|---|
| 1 | No $P_2O_5$ was added. | 21.5 | 0.11 | −40.1° |
| 2 | The whole amount was added after 5 hrs. | 92.6 | 0.80 | −68.4° |
| 3 | One half of the whole amount each was added after 5 hrs and 10 hrs. | 94.1 | 0.78 | −68.0° |
| 4 | One-third of the whole amount each was added after 5 hrs, 10 hrs and 15 hrs. | 95.4 | 0.90 | −68.2° |

The polymerization was carried out for 6 days. ηinh and [α] were measured under the same conditions as in Example 2.

EXAMPLE 4

In 1.5 ml of DMSO was dissolved 1.2 g of the monomer obtained in Example 1(1), after which 0.5 g of N-methylmorpholine was added and the resulting mixture was subjected to reaction in a shaking thermostat at 40° C. An experiment was carried out by changing a method for adding a total amount of 2.0 g of phosphorus pentoxide after initiation of the reaction as shown in Table 4. After the reaction, the gelatinous substance formed was diluted with 25 ml of DMF and poured into 200 ml of methanol containing 50% water. The precipitate formed was collected by filtration, washed successively with methanol, water, methanol and ether, and dried to obtain the desired product. The results are shown in Table 4.

TABLE 4

| Run No. | Addition conditions of $P_2O_5$ | Yield % | ηinh | $[\alpha]_D^{28}$ |
|---|---|---|---|---|
| 1 | No $P_2O_5$ was added. | <1 | — | — |
| 2 | The whole amount was added after 3 hrs. | 83.2 | 0.50 | −86.7° |
| 3 | One half of the whole amount each was added after 3 hrs and 5 hrs. | 85.1 | 0.48 | −86.5° |
| 4 | One-third of the whole amount each was added after 3 hrs, 5 hrs and 7 hrs. | 87.4 | 0.55 | −86.9° |
| 5 | A quarter of the whole amount each was added after 3 hrs, 5 hrs, 7 hrs and 10 hrs. | 87.0 | 0.51 | −86.5° |

The polymerization was carried out for 6 days. The measurement conditions of ηinh and [α] were the same as in Example 2.

What is claimed is:

1. A process for producing a sequential polyamino acid resin having a high molecular weight and special amino acid sequence as repeating unit in the resin, which comprises
conducting a polycondensation reaction of a dipeptide active ester acid salt represented by the formula:

$$H{-}X_1{-}X_2{-}Y.Z \qquad (I)$$

wherein $X_1$ and $X_2$ are independently L-, D- or DL-α-amino acid residues protected or non-protected at a side chain in the formula: H—$X_1$—OH or H—$X_2$—OH in which H is a hydrogen atom in an amino group and may be replaced by a protective group for an amino acid, and OH is the hydroxyl moiety in a carboxyl group; H is a hydrogen atom in an amino group; Y is a functional group represented by the formula:

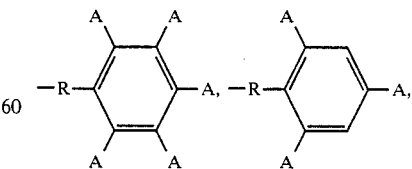

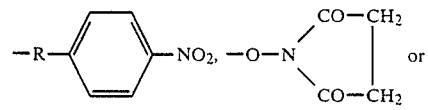

-continued

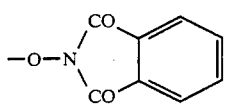

in which A is a chlorine or bromine atom, and R is a sulfur or oxygen atom; and Z is HBr, HCl, HF, CF₃COOH or p-toluenesulfonic acid, in an aprotic polar solvent in the presence of a tertiary amine and phosphorus pentoxide.

2. A process according to claim 1, wherein the addition of phosphorus pentoxide to the reaction mixture is conducted after the addition of a tertiary amine to the reaction mixture.

3. A process according to claim 2, wherein the amount of tertiary amine to be added is 1 to 5 equivalent weight per equivalent weight of the dipeptide active ester acid salt of the formula (I).

4. A process according to claim 2, wherein the amount of phosphorus pentoxide to be added is 0.01 to 10 equivalent weight per equivalent weight of the dipeptide active ester acid salt of the formula (I).

5. A process according to claim 1, wherein the polycondensation reaction is carried out at 20°–100° C.

6. A process according to claim 2, wherein phosphorus pentoxide is added to the reaction mixture after 10 minutes to 48 hours from the beginning of the poly-condensation.

7. A process according to claim 1, wherein the monomer of the formula (I) is
leucyl-glycine pentachlorophenyl ester.hydrochloride, or
N-ε-benzyloxycarbonyl-lysyl-glutamic acid-γ-benzyl-α-p-nitrophenyl ester.p-toluenesulfonate.

8. A sequential polyamino acid having an inherent viscosity measured at concentration of 0.075 in dichloroacetic acid at 30° C. of 0.51 or more produced by the process of claim 1.

* * * * *